United States Patent [19]

Riding

[11] Patent Number: 5,310,601
[45] Date of Patent: May 10, 1994

[54] EPOXY-FUNCTIONALIZED SILOXANE RESIN COPOLYMERS AS CONTROLLED RELEASE ADDITIVES

[75] Inventor: Karen D. Riding, Castleton, N.Y.

[73] Assignee: General Electric Company, Waterford, N.Y.

[21] Appl. No.: 867,633

[22] Filed: Apr. 13, 1992

Related U.S. Application Data

[62] Division of Ser. No. 573,416, Aug. 24, 1990, Pat. No. 5,158,991.

[51] Int. Cl.$^5$ .................. B32B 9/04; B32B 13/12; B32B 15/04; B32B 17/06
[52] U.S. Cl. .................. 428/429; 428/447; 428/450; 428/451; 428/452; 522/170; 522/31; 522/172
[58] Field of Search .......... 522/170, 31, 172; 428/429, 447, 450, 451, 452

[56] References Cited

U.S. PATENT DOCUMENTS

| | | | |
|---|---|---|---|
| 3,527,659 | 9/1970 | Keil | 428/450 |
| 4,370,358 | 1/1983 | Hayes et al. | 522/170 |
| 4,547,431 | 10/1985 | Eckberg | 522/31 |

Primary Examiner—Marion E. McCamish
Assistant Examiner—Susan Berman

[57] ABSTRACT

An ultraviolet radiation-curable epoxyfunctionalized silicone controlled release composition having increased release levels is provided, comprising:
  (A) an epoxyfunctional diorganopolysiloxane;
  (B) a catalytic amount of a photocatalyst or a combination of photocatalysts; and
  (C) from about 1% to about 30% by weight based on (A) of an epoxyfunctional siloxane resinous controlled release additive comprising monovalent siloxane and epoxyfunctional siloxane units and tetravalent $SiO_2$ units.

A release of at least 500 grams/2 inches is achieved by using from about 20% to about 30%, preferably from about 25% to about 30%, of component (C) and dispersing components (A)–(C) in (D) an amount of a hydrocarbon solvent sufficient to provide the composition with a solids content of about 20% and a solvent content of about 80%.

26 Claims, 1 Drawing Sheet

EPOXY-FUNCTIONALIZED SILOXANE RESIN COPOLYMERS AS CONTROLLED RELEASE ADDITIVES

This application is a division of application Ser. No. 07/573,416, filed Aug. 24, 1990, U.S. Pat. No. 5,158,991.

BACKGROUND OF THE INVENTION

The present invention relates to controlled release silicone coating compositions. More particularly, the present invention relates to controlled release ultraviolet (UV) radiation-curable epoxyfunctional silicone compositions containing an epoxy-functionalized siloxane resinous copolymer as a controlled release additive.

Silicone compositions are widely used as release coatings for rendering a surface relatively nonadherent to other materials which would normally adhere -closely thereto. Because of their high reactivity, low cost, ease of maintenance, and low potential hazard to industrial users, UV-curable epoxyfunctional silicones are particularly suitable for release applications. UV-curable epoxyfunctional silicone release compositions are known in the art and are described, for example, in U.S. Pat. Nos. 4,547,431 (Eckberg); 4,576,999 (Eckberg); 4,279,717 (Eckberg); 4,421,904 (Eckberg et al.); and 4,952,657 (Riding et al.).

As used herein, the term "release" refers to the force required to separate an adhesive from a surface to which it is adhered. "Controlled release additives" (or "CRAs") are materials added to composition to raise the release of the composition.

Controlled release additives for silicone release coating compositions are known in the art. Reference is made, for example, to U.S. Pat. Nos. 4,123,604 (Sandford, Jr.); 3,527,659 (Keil); 4,547,431 (Eckberg); and 4,952,657 (Riding et al.).

U.S. Pat. Nos. 4,123,604 to Sandford, Jr. and 3,527,659 to Keil, and commonly assigned U.S. application Ser. No. 416,576, filed Sep. 10, 1982, now abandoned, describe MQ and vinyl MQ resinous copolymers as release-increasing controlled release additives for heat-curable silicone release systems.

U.S. Pat. No. 4,547,431 (Eckberg) discloses a controlled release ultraviolet radiation-curable epoxy functional controlled release composition comprising an epoxyfunctional diorganopolysiloxane, a photocatalyst, and an epoxy monomer. The epoxy monomer, in sufficient amounts, functions to raise the release of the cured release composition.

U.S. Pat. No. 4,952,657 to Riding et al. (Riding) discloses the use of a phenolic epoxysilicone copolymer as a controlled release additive for an epoxy functional silicone release coating. The phenolic epoxysilicone copolymer controlled release additive used in the Riding composition provides a maximum release level of only 150-200 g/2 inches.

There is a present need in the marketplace for controlled release additives that can provide release levels of as high as 500 g/2 inches against various pressure sensitive adhesives, such as natural rubbers, acrylics and the like.

Accordingly, the primary object of the present invention is to provide an improved controlled release epoxyfunctional silicone composition having increased release levels, i.e., of at least about 500 g/2 inches.

It is a further object of this invention to provide a method for increasing the release levels of a UV-curable epoxyfunctional silicone composition.

These and other objects are achieved in the present invention.

SUMMARY OF THE INVENTION

The present invention is based on the discovery that the release of a UV-curable epoxyfunctional silicone release composition can be increased to 500 grams/2 inches and higher by combining the release composition with critical amounts of a resinous copolymer containing dialkylepoxy siloxane monovalent units, trialkylsiloxane monovalent siloxane units, and tetravalent siloxane units, and a hydrocarbon or halogenated hydrocarbon solvent.

The present invention provides an improved controlled release ultraviolet radiation-curable epoxyfunctional silicone composition, comprising:

(A) an epoxyfunctional diorganopolysiloxane having the general formula $$R_2R^1SiO(RR^1SiO)_x(R_2SiO)_ySiR_2R^1 \qquad (I)$$

wherein R is individually a lower alkyl radical having from 1 to about 3 carbon atoms; $R^1$ individually is a monovalent cycloaliphatic epoxy-functional organic radical having from 2 to about 20 carbon atoms; "x" is a number ranging from about 1 to about 50; and "y" is a number ranging from about 1 to about 1000;

(B) a catalytic amount of a photocatalyst or a combination of photocatalysts; and (C) from about 1% to about 30% by weight based on (A) of a siloxane resinous copolymer comprising monovalent $R_3^2SiO_{\frac{1}{2}}$ and $R^3R_2^2SiO_{\frac{1}{2}}$ units and tetravalent $SiO_{4/2}$ units, the ratio of the monovalent units to tetravalent units being from about 0.6:1 to about 1.1:1; wherein $R^2$ individually is a monovalent hydrocarbon radical of no more than 2 carbon atoms, $R^3$ is a monovalent epoxy functional organic radical of from about 2 to about 20 carbon atoms; the $R^3R_2^2SiO_{\frac{1}{2}}$ units comprising from about 1% to about 90% of the total number of monovalent units present.

The composition of this invention preferably further comprises (D) a hydrocarbon or halogenated hydrocarbon solvent.

Release compositions having a release of 500 grams/2 inches and higher are achieved by using component (C) at an amount within the range of from about 20% to about 30% by weight based on (A) and component (D) at an amount sufficient to provide the release composition with a solids content of 20% and a solvent content of about 80% by weight based on the weight of the total composition.

DETAILED DESCRIPTION OF THE INVENTION

Figure 1:
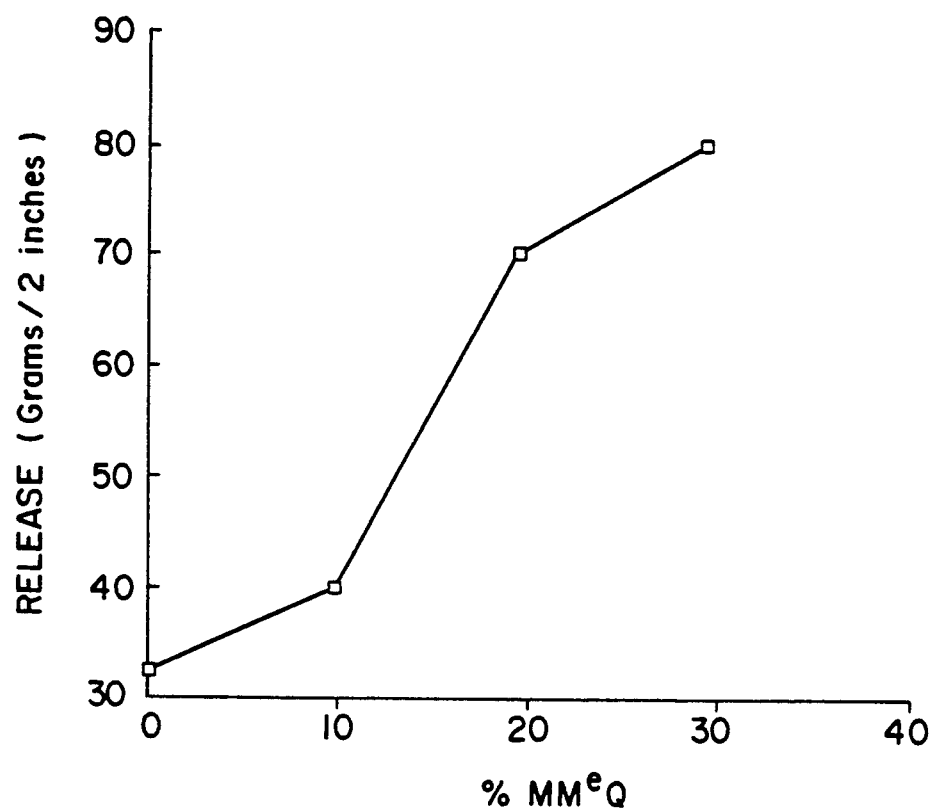
FIGURE 1 is graph which plots the relationship between the amount of the controlled release additive, i.e., component (C), and the release characteristics, measured in grams/2 inches, of the UV-cured epoxyfunctional silicone controlled release composition of the present invention.

Component (A) is an epoxyfunctional diorganopolysiloxane having the general formula $$R_2R^1SiO(RR^1SiO)_x(R_2SiO)_ySiR_1R_2 \quad (i)$$

wherein R is individually a lower alkyl radical having from 1 to about 8 carbon atoms; $R^1$ individually is a monovalent cycloaliphatic epoxy-functional organic radical having from 2 to about 20 carbon atoms; "x" is a number ranging from about 1 to about 50; and "y" is a number ranging from about 1 to about 1000.

In the epoxyfunctional polydiorganopolysiloxane of formula (I), R is preferably a methyl group and $R^1$ is preferably a group derived from 4-vinylcyclohexeneoxide. The value for "x" is preferably from about 1 to about 20 and most preferably from about 1 to about 10. The value for "y" is preferably from about 1 to about 100 and most preferably from about 95 to about 100.

The epoxy functionality is obtained when certain of the hydrogen atoms on the polysiloxane chain of a polydialkyl-alkylhydrogensiloxane copolymer are reacted in a hydrosilation addition reaction with other organic molecules which contain both ethylenic unsaturation and epoxide functionality. Ethylenically unsaturated species will add to a polyhydroalkylsiloxane to form a copolymer in the presence of catalytic amounts of a precious metal catalyst.

The vinyl- or allyl-functional epoxides contemplated are any of a number of aliphatic (glycidyl) or cycloaliphatic epoxy compounds having olefinic moieties which will readily undergo addition reactions with SiH-functional groups. Commercially obtainable examples of such compounds include allyl glycidyl ether, methallyl glycidyl ether, 1-methyl-4-isopropenyl cyclohexeneoxide (limoneneoxide, SCM Corp.), 2,6-dimethyl-2,3-epoxy-7-octene (SCM Corp.), 1,4-dimethyl-4-vinylcyclohexeneoxide (Viking Chemical Co.), and 4-vinyl cyclohexene monoxide. 4-vinyl cyclohexene monoxide is preferred.

Component (B) is a photocatalyst or combination of photocatalysts, which promotes the UV cure of the epoxyfunctional silicone. Preferred photocatalysts for the epoxyfunctional silicone compositions are the onium salts having the formulae:

$$R_2^4I^+MX_n$$

$$R_3^4MX_n$$

$$R_3^4Se^+MX_n$$

$$R_4^4P^+MX_n$$

$$R_4^4N^+MX_n$$

wherein each $R^4$ is independently an organic radical of from 1 to 30 carbon atoms. Radicals represented by $R^4$ include aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitrogen, chloro, bromo, cyano, carboxy, mercapto, and the like, as well as aromatic heterocyclic radicals including, e.g., pyridyl, thiophenyl, pyranyl, and the like.

In the onium salt formulaes provided above, $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

The preferred onium salts for use in the composition of this invention are the diaryliodonium salts, such as bis(dodecylphenyl)iodonium hexafluoroarsenate and bis(dodecylphenyl)iodonium hexafluoroantimonate, with bis(dodecylphenyl)iodonium hexafluoroantimonate being the most preferred.

The amount of catalyst used is not critical, so long as proper cure is effected. As with any catalyst, it is preferable to use the smallest effective amount possible; however, for purposes of illustration, catalyst levels of from about 1% to about 5%, and preferably from about 1% to about 3%, by weight based on the weight of component (A), have been found suitable.

Component (C) is a siloxane resinous copolymer controlled release additive comprising a siloxane resinous copolymer comprising monovalent $R_3{}^2SiO_{\frac{1}{2}}$ units ("M" units) and $R^3R_2{}^2SiO_{\frac{1}{2}}$ units ("M$^{e}$" units) and tetravalent $SiO_{4/2}$ units ("Q" units), the ratio of the monovalent units to tetravalent units being from about 0.6:1 to about 1.1:1; wherein $R^2$ individually is a monovalent hydrocarbon radical of no more than 2 carbon atoms, $R^3$ is a monovalent epoxy functional organic radical of from about 2 to about 20 carbon atoms; the monovalent $R^3R_2{}^2SiO_{\frac{1}{2}}$ units comprising from about 1% to about 90% of the total number of monovalent units present.

In the formulas of the units present in the siloxane resinous copolymer of component (C), radicals represented by $R^2$ include, for example, methyl, ethyl, or vinyl. Preferably, $R^2$ is methyl or vinyl, and most preferably methyl.

In preferred embodiments of the resinous copolymer of component (C), $R^2$ is methyl, and $R^3$ is a radical derived from 4-vinylcyclohexeneoxide and has the formula:

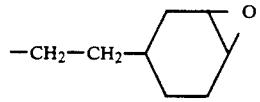

The $R^3R_2{}^2SiO_{\frac{1}{2}}$ units preferably comprise from about 10% to about 50% and most preferably from about 10% to about 25% of the total number of monovalent units present in the resinous copolymer of component (C).

The siloxane resinous copolymer of Component (C) can be prepared from the addition reaction between a precious metal catalyst, a vinyl epoxide, and a SiH-containing resin.

The SiH-containing resinous copolymer used in making component (C) consists essentially of monovalent $R^2SiO_{\frac{1}{2}}$ and $HR_2{}^3SiO_{\frac{1}{2}}$ units and tetravalent $SiO_{4/2}$ units, wherein $R^2$ is as defined previously herein. SiH-containing resinous copolymers containing monovalent and tetravalent units and methods for preparing them are described in U.S. Pat. No. 4,774,310 to Butler, which is hereby incorporated by reference herein.

Typically, the SiH-containing resinous copolymer is prepared by reacting a siloxane resin consisting essentially of $R_3{}^2SiO_{\frac{1}{2}}$ units and $SiO_{4/2}$ units with a disiloxane $(HR_3{}^2Si)_2O$ in the presence of an acidic catalyst. The reaction may generally be carried out by heating a mixture of the reagents and the catalyst. Following the reaction, the catalyst is preferably removed by means of filtration.

Examples of suitable acidic catalysts for the preparation of the SiH-containing resinous copolymer are disclosed in U.S. Pat. No. 4,774,310, previously incorporated by reference herein. Such catalysts include equilibration catalysts, e.g., trifluoromethane sulphonic acid; and other acidic catalysts such as, for example, HCl, $H_2SO_4$, supported acid catalysts, paratoluene sulphonic acid, and a FILTROL (Registered Trademark) clay, which is an acid-activated clay.

The vinyl- or allyl-functional epoxides used in the preparation of component (C) are any number of aliphatic or cycloaliphatic epoxy compounds having olefinic moieties which will readily undergo addition reaction to SiH functional groups. Commercially obtainable examples of such compounds include allyl glycidyl ether, methallyl glycidyl ether, 1-methyl-4-isopropenyl cyclohexeneoxide (limoneneoxide; SCM Corp.), 2,6-dimethyl-2-3-epoxy-7-octene (SCM Corp.), 1,4-dimethyl-4-vinylcyclohexeneoxide (Viking Chemical Co.), and 4-vinylcyclohexeneoxide. 4-Vinylcyclohexeneoxide is preferred.

Examples of suitable precious metal catalysts for the addition reaction involved in the preparation of component (C) include platinum-metal complexes which include complexes of ruthenium, rhodium, palladium, osmium, iridium, and platinum. Platinum complexes are preferred.

Component (C) is present in the composition of this invention in an amount ranging from about 1% to about 30%, preferably from about 20% to about 30%, and most preferably from about 25% to about 30%, percent by weight based on component (A).

In preferred embodiments of the present invention, the composition of this invention further comprises a hydrocarbon or halogenated hydrocarbon solvent in an amount sufficient to provide the composition with a solids content of from about 10% to about 50% by weight, preferably from about 10% to about 20% by weight, and most preferably 20% by weight; and a solvent content of from about 50% to about 90% by weight, preferably from about 80% to about 90%, and most preferably about 80% by weight, the percentages being based on the total weight of components (A)-(D).

The presence of component (C) at levels of about 20% to about 30% and component (D) at an amount sufficient to provide the composition of this invention with a solids content of about 20% and a solvent content of about 80% leads to a release composition havong a release of 500 grams/2 inches and higher.

Examples of hydrocarbon solvents which can be used herein include hexane, acetone, toluene, benzene, xylene, and mixtures thereof. An example of a halogenated hydrocarbon solvent is methylene chloride. Preferably, the solvent is a hydrocarbon solvent and most preferably a mixture of acetone and hexane having a acetone:hexane weight ratio of 1:1.

The UV-curable release coating composition of the present invention is formed by simply mixing the epoxyfunctional silicone component, catalytic amounts of the catalyst, and suitable amounts of the controlled release additive, i.e., component (C).

The UV-curable epoxyfunctional silicone compositions of the present invention can be applied to cellulosic and other substrates including paper, metal, foil, glass, polyethylene coated kraft paper, supercalendered kraft paper, polyethylene films, polypropylene films and polyester films.

A photoinitiated reaction will cure the epoxyfunctional silicone compositions to form an adhesive surface on the coated substrate. Inerting of the cure environment, such as with nitrogen, may be desirable where the presence of oxygen inhibits the cure reaction; however, inerting is not necessary when the preferred onium salt photoinitiators are used.

In order that persons skilled in the art may better understand the practice of the present invention, the following examples are provided by way of illustration, and not by way of limitation.

EXPERIMENTAL

In the examples below, the terms listed below have the indicated meanings:

"MQ"—describes a resinous copolymer comprising monovalent trialkyl units and tetravalent $SiO_{4/2}$ units.

"MM$^e$Q"—describes resinous copolymer comprising monovalent epoxydialkyl units, monovalent trialkyl units, and tetravalent $SiO_{4/2}$ units.

"MM$^H$Q"—describes resinous copolymer comprising monovalent hydrogendialkyl units, monovalent trialkyl units, and tetravalent $SiO_{4/2}$ units.

EXAMPLE 1

This example illustrates the preparation of an SiH functional MQ resin, used to make the MM$^e$Q resinous controlled release additive in the present invention.

The SiH functional MQ resin was synthesized as follows:

An MQ resin (340.8 grams as 60% solids in toluene), filtrol (Registered Trademark) 20 (2.4 grams) catalyst (hereinafter "acid catalyst") and tetramethyldisiloxane (3.28 grams) were combined in a one liter three necked flask equipped with a magnetic stirrer, a reflux condenser and a nitrogen inlet. The resulting mixture was heated at 100° C. for 5 hours. The reaction mixture was allowed to cool to room temperature and then filtered to remove the catalyst. An infrared spectrum showed the presence of an Si-H peak at approximately 2200 $cm^{-1}$.

EXAMPLE 2

Example 2 illustrates the synthesis of MM$^e$Q, used as the controlled release additive in the composition of this invention.

The MM$^H$Q resin (150 grams) prepared in Example 1, toluene (100 grams), and platinum (0.02 grams) were combined in a one liter three necked flask equipped with a magnetic stirrer, a reflux condenser and a nitrogen inlet. The resulting reaction mixture was heated to 70° C. 4-Vinylcyclohexeneoxide (34.9 grams) was slowly added to this mixture. A strong exotherm up to 85° C. was observed. At the end of the addition, the reaction mixture was then heated at 70° C. for 2 hours. An infrared spectrum showed the absence of an Si-H peak at approximately 2200 $cm^{-1}$. Tetramethylurea (0.02 grams) and 1-dodecanethiol (0.02 grams) were added to deactivate the platinum.

EXAMPLES 3-5

Example 3 illustrates the use of the MM$^e$Q resin prepared in Example 2 above as a controlled release additive in the composition of this invention.

Three samples were prepared comprising an MM$^e$Q resin prepared according to the method described in Example 2 above, an epoxyfunctional silicone having an epoxy equivalent weight of 900, solvent (20% solids in 1:1 hexane/acetone) and 2% of the bis(dodecylphenyl)iodonium hexafluoroantimonate (hereinafter "UV catalyst"). The formulations of these samples are shown in Table 1 below.

TABLE 1

| | Formulations: Examples 3-5 | |
| --- | --- | --- |
| Example No. | MM$^e$Q | Epoxy Silicone |
| 3 | 10% | 90% |
| 4 | 20% | 80% |
| 5 | 30% | 70% |

The samples prepared in Examples 3-5 were coated on polyethylene coated Kraft paper and then cured in an RPC model QC1202 UV processor at a line speed of 100 ft/min in an ambient atmosphere using two Hg arc lamps at 200 watts power. Laminates were prepared on the sample-coated Kraft paper by applying the National Starch Rubber Based Adhesive and then pressing a sheet of uncoated super calendered Kraft (SCK) paper onto the adhesive layer. Release performance was measured by pulling the SCK-adhesive lamina from the sample coating-Kraft paper laminate at a 180 degree peel at 400 in/min using a Scott Machine Products tester. The force required to separate two-inch wide strips of the laminates over a period of time was recorded and the results are shown in Table 2 below. In addition to the release levels, the sound made as the laminates were separated was also recorded and summarized in Table 2 below. The individual cured release films used in these examples do not contain an even distribution of Q units, which results in the different sections of the film having different release properties, based on the amount of Q units in the region. The more Q units in a particular section, the greater the adhesion between the release film at that section and the adhesive laminate. Thus, the adhesive laminate will adhere more strongly to some portions of the release film than to others. The zipper-like sound as the laminates are separated is a result of the different release pockets between the various film sections and the adhesive laminate. The greater the force required to separate the laminates, the louder or "zippier" the sound. The lower the force required to separate the laminates, the quieter or less "zippy" the sound. In Table 2, the terms "z" and "sl.z." refers to "zippy" and "slightly zippy", respectively.

TABLE 2

| | Examples 3-5: Release Data Release (grams/2 inches) | | | | |
| --- | --- | --- | --- | --- | --- |
| Example No. | Initial | 1 day | 1 week | 2 weeks | 4 weeks |
| 3 | 70-90 slz | 75-95 slz | 100-130 z | 90-120 z | 80-100 slz |
| 4 | 140-180 z | 500 z | 500 z | 500 z | 500 z |
| 5 | 500+ z | 500+ z | 500+ z | 500+ z | 500+ z |

The data shown in Table 2 above indicates that the MM$^e$Q resin has a significant effect on release and functions as a controlled release additive. It can also be seen from Table 2 that the presence of the controlled release additive at amounts of 20% (Example 4) and 30% (Example 5) can provide the composition of this invention with release levels of 500 grams/2 inches and above.

EXAMPLE 6

An MM$^H$Q resin (2000 grams as 60% solids in toluene), filtrol 20 (46.4 grams) and tetramethyldisiloxane (290 grams) were combined in a one liter three necked flask equipped with a magnetic stirrer, a reflux condenser and a nitrogen outlet. The resulting mixture was heated to 100° C. for 5 hours. The reaction mixture was allowed to cool to room temperature and then filtered to remove the filtrol. An infrared spectrum showed the presence of an Si-H peak at approximately 2200 cm$^{-1}$. A gasimetric hydride titration test showed the presence of 0.176% H.

EXAMPLE 7

The MM$^H$Q resin (2000 grams) prepared in Example 6 was combined with platinum (0.35 grams) in a one liter three necked flask equipped with a magnetic stirrer, a reflux condenser, and a nitrogen outlet. The resulting reaction mixture was heated to 70° C. 4-Vinylcyclohexeneoxide (436 grams) was slowly added to this mixture. A strong exotherm up to 85° C. was observed. At the end of the addition, the reaction mixture was then heated at 70° C. for 2 hours. An infrared spectrum showed the absence of an Si-H peak at approximately 2200 cm$^{-1}$. Tetramethylurea (0.25 grams) and 1-dodeconethiol (0.1 gram) was added to deactivate the platinum. The reaction mixture was lightly stripped at 120° C. and 1 mm until the % solids were approximately 80% by weight.

EXAMPLES 8-10 AND COMPARATIVE EXAMPLE A

Four samples were prepared containing an epoxyfunctional silicone, and 3% by weight of the UV catalyst. Three of the samples (Examples 8-10) contained MM$^e$Q resins at levels of 10%, 20%, and 30%, the percents being by weight based on the weight of the epoxyfunctional silicone. Comparative A contained no MM$^e$Q resin. The samples were coated on polyethylene coated Kraft paper and then cured via 2 banks of Fusion H lamps at a line speed of 100 ft/min. in an ambient atmosphere using two Hg arc lamps at 300 watts power. Laminates were prepared as described in Examples 3-5 above. The release levels obtained versus the amount of MM$^e$Q resin present are shown in FIGURE 1. In FIGURE 1, the term "NSRB" refers to the National Starch Rubber Based Adhesive used in the laminate with super calendered Kraft paper.

It can be seen from FIGURE 1 that the release level of the composition of this invention is proportional to the amount of MM$^e$Q resin present. Comparison of the results shown in FIGURE 1 and those obtained in Examples 3-5 shows that the compositions containing solvent have higher release than those which do not contain solvent.

What is claimed is:

1. An improved ultraviolet radiation-curable epoxyfunctional silicone controlled release composition, comprising:

(A) an epoxyfunctional diorganopolysiloxane having the general formula

$$R_2R^1SiO(RR^1SiO)_x(R_2SiO)_ySiR_2R^1 \qquad (I)$$

wherein R is individually a lower alkyl radical having from 1 to about 8 carbon atoms; $R^1$ individually is a monovalent cycloaliphatic epoxy-functional organic radical having from 2 to about 20 carbon atoms; "x" is a number ranging from about 1 to about 50; and "y" is a number ranging from about 1 to about 1000;

(B) a catalytic amount of a photocatalyst or a combination of photocatalysts; and (C) from about 1% to about 30% by weight based on (A) of a siloxane resin comprising monovalent $R_3{}^2SiO_{\frac{1}{2}}$ and $R^3R_2{}^2SiO_{\frac{1}{2}}$ units and tetravalent Si-$O_{4/2}$ units, the ratio of the monovalent units to tetravalent units being from about 0.6:1 to about 1.1:1; wherein $R^2$ individually is a monovalent hydrocarbon radical of no more than 2 carbon atoms, $R^3$ is a monovalent epoxy functional organic radical of from about 2 to about 20 carbon atoms; and the $R^3R_2{}^2SiO_{\frac{1}{2}}$ units comprising from about 1% to about 90% of the total number of monovalent units present.

2. A composition according to claim 1 wherein R and $R^2$ are each methyl groups; $R^1$ and $R^3$ are each groups derived from 4-vinylcyclohexeneoxide; "x" is a number ranging from 1 to about 20; and "y" is a number ranging from about 1 to about 100.

3. A composition according to claim 2 wherein "x" is a number ranging from 1 to about 10 and "y" is a number ranging from about 95 to about 100.

4. A composition according to claim 1 wherein the photocatalyst is an onium salt.

5. A composition according to claim 4 wherein the onium salt is a diaryl iodonium salt.

6. A composition according to claim 5 wherein the diaryl iodonium salt is bis(dodecylphenyl)iodonium hexafluoroantimonate.

7. A composition according to claim 1 wherein the photocatalyst is present in an amount within the range of from about 1% to about 5% by weight based on component (A).

8. A composition according to claim 1 wherein in component (C), the $R^3R_2{}^2SiO_{\frac{1}{2}}$ units preferably comprise from about 10% to about 50% of the total number of monovalent units present.

9. A composition according to claim 8 wherein in component (C), the $R^3R_2{}^2SiO_{\frac{1}{2}}$ units preferably comprise from about 10% to about 25% of the total number of monovalent units present.

10. A composition according to claim 1 wherein component (C) is present in an amount within the range of from 20% to about 30% by weight based on component (A).

11. A composition according to claim 10 wherein component (C) is present in ah amount within the range of from 25 to about 30% by weight based on component (A).

12. A composition according to claim 1 further comprising a hydrocarbon solvent or halogenated hydrocarbon solvent in an amount sufficient to provide the composition with a solids content of from about 10 to about 50% by weight and a solvent content of from about 50 to about 90% by weight, the percentages being based on the total weight of the composition.

13. A composition according to claim 12 wherein the solvent is present in the composition in an amount sufficient to provide the composition with a solids content of from about 10 to about 20% by weight and a solvent content of from about 80 to about 90% by weight, the percentages being based on the total weight of the composition.

14. A composition according to claim 13 wherein the solvent is present in the composition in an amount sufficient to provide the composition with a solids content of about 20% by weight and a solvent content of about 80% by weight, the percentages being based on the total weight of the composition.

15. A composition according to claim 12 wherein the solvent is a hydrocarbon solvent selected from the group consisting of hexane, acetone, toluene, benzene, xylene, and mixtures thereof.

16. A composition according to claim 15 wherein the solvent is a mixture of acetone and hexane having a acetone:hexane weight ratio of 1:1.

17. The cured composition of claim 1.

18. A solid substrate coated on at least one surface with the curable composition of claim 1.

19. A coated substrate according to claim 18 wherein the substrate is selected from the group consisting of paper, metal, foil, glass, polyethylene coated kraft paper, super calandered kraft paper, polyethylene films, polypropylene films, and polyester films.

20. A coated substrate according to claim 18 wherein the controlled release composition has been cured on the substrate.

21. An improved ultraviolet radiation-curable epoxyfunctionalized silicone controlled release composition, having a release of at least about 500 grams/2 inches, comprising:

(A) an epoxyfunctional diorganopolysiloxane having the general formula $$R_2R^1SiO(RR^1SiO)_x(R_2SiO)_ySiR_2R^1 \qquad (i)$$

wherein R is individually a lower alkyl radical having from 1 to about 8 carbon atoms; $R^1$ individually is a monovalent cycloaliphatic epoxy-functional organic radical having from 2 to about 20 carbon atoms; "x" is a number ranging from about 1 to about 50; and "y" is a number ranging from about 1 to about 1000;

(B) a catalytic amount of a photocatalyst or a combination of photocatalysts; and (C) from about 20% to about 30% by weight based on (A) of a siloxane resin comprising monovalent $R_3{}^2SiO_{\frac{1}{2}}$ and $R^3R_2{}^2SiO_{\frac{1}{2}}$ units and tetravalent Si-$O_{4/2}$ units, the ratio of the monovalent units to tetravalent units being from about 0.6:1 to about 1.1:1; wherein $R^2$ individually is a monovalent hydrocarbon radical of no more than 2 carbon atoms, $R^3$ is a monovalent epoxy functional organic radical of from about 2 to about 20 carbon atoms; and the $R^3R_2{}^2SiO_{\frac{1}{2}}$ units comprising from about 1% to about 90% of the total number of monovalent units present; and (D) a hydrocarbon solvent in an amount sufficient to provide the composition With a solids content of about 20% by weight and a solvent content of about 80% by weight, the percentages being based on the total weight of components (A)-(D).

22. A composition according to claim 21 wherein (A) is a dimethylepoxy-chainstopped polydimethylmethylepoxysiloxane having the general formula $$(CH_3)_2R^1SiO(CH_3R^1SiO)_x[(CH_3)_2SiO]_ySi(CH_3)_2R^1$$

wherein $R^1$ is a monovalent cycloaliphatic epoxy-functional organic radical derived from 4-vinylcyclohexeneoxide; "x" is a number ranging from about 1 to about 20; and "y" is a number ranging from about 1 to about 100; (B) is a bis(dodecylphenyl)iodonium hexafluoroantimonate present in an amount within the range of from about 1% to about 5% by weight based on (A); (C) is a siloxane resin comprising monovalent $(CH_3)_3SiO_{\frac{1}{2}}$ and $R^3(CH_3)_2SiO_{\frac{1}{2}}$ units and tetravalent $SiO_{4/2}$ units, present in an amount within the range of from about 20% to about 30% by weight based on (A), the ratio of the monovalent units to tetravalent units being from about 0.6:1 to about 1.1:1, wherein $R^3$ is a monovalent cycloaliphatic epoxy-functional organic radical derived from 4-vinylcyclohexeneoxide; the $R^3(CH_3)_2SiO_{\frac{1}{2}}$ units comprising from about 10% to about 50% of the total number of monovalent units present; and (D) is selected from the group consisting of acetone, hexane, toluene, methylene chloride, or a mixture of the foregoing.

23. A composition according to claim 22 wherein "x" is a number ranging from about 1 to about 10; "y" is a number ranging from about 95 to about 100; (B) is present in an amount within the range of from about 1% to about 3% by weight based on (A); (C) is present in an amount within the range of from about 25% to about 30% by weight based on (A); the $R^3(CH_3)_2SiO_{\frac{1}{2}}$ units in (C) comprise from about 10% to about 25% of the total number of monovalent units present; and (D) is a mixture of hexane and acetone with a hexane:acetone weight ratio of 1:1.

24. The cured composition of claim 21.

25. A solid substrate coated on at least one surface with the curable composition of claim 21.

26. A coated substrate according to claim 25 wherein the controlled release composition has been cured on the substrate.

* * * * *